June 19, 1928. 1,674,181
F. J. SCHWIMMER
COUNTERBALANCE
Filed Feb. 23, 1927 2 Sheets-Sheet 2
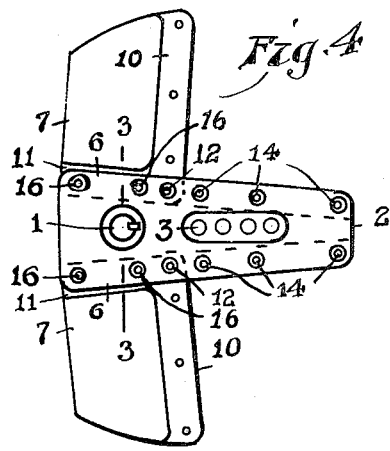
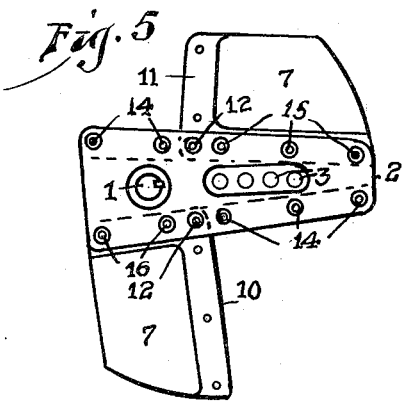
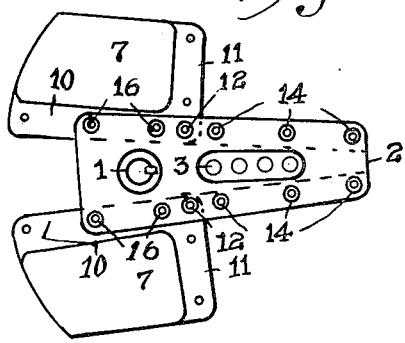
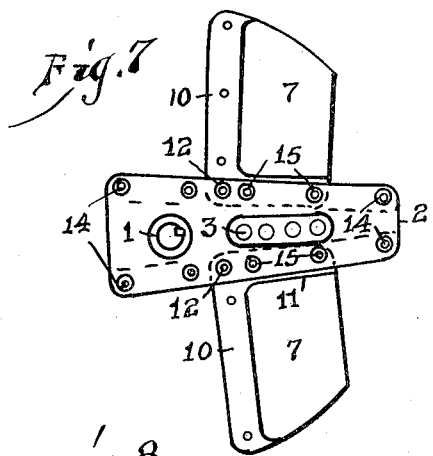
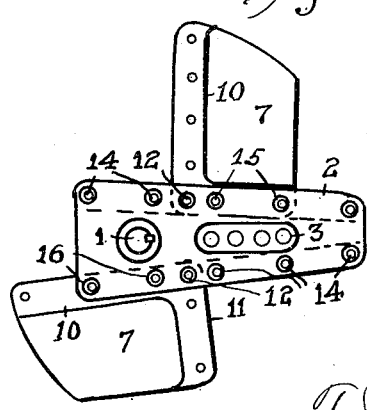
INVENTOR.
F. J. Schwimmer
BY
ATTORNEY.

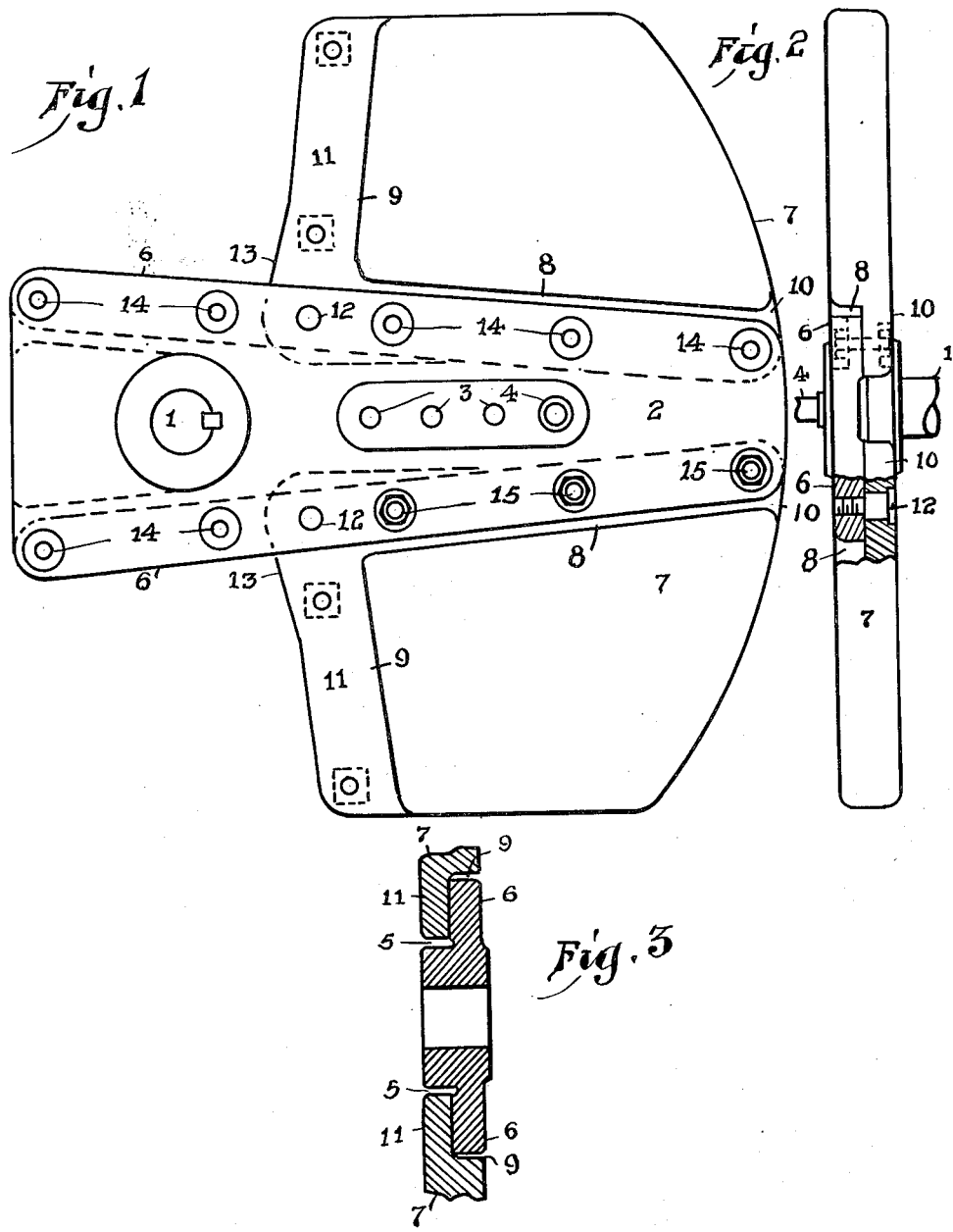

Patented June 19, 1928.

1,674,181

UNITED STATES PATENT OFFICE.

FREDRICK J. SCHWIMMER, OF TOLEDO, OHIO, ASSIGNOR TO THE NATIONAL SUPPLY COMPANY, OF TOLEDO, OHIO, A CORPORATION OF OHIO.

COUNTERBALANCE.

Application filed February 23, 1927. Serial No. 170,206.

My invention relates to counterbalances designed particularly for use with cranks or eccentric masses attached to rotatable shafts.

One object of this is to provide a crank with counterweights adjustable angularly in planes transverse of the shaft with which the weights are associated, and more particularly to provide for the weights pivots which are eccentric to the shaft, the adjustments preferably being made by rotating the weights or either of them clockwise or counterclockwise as the conditions to be met require. Other objects appear hereinafter.

Referring to the accompanying drawings, Fig. 1 is an end view of a shaft with the counterweights arranged for maximum eccentricity of their mass; Fig. 2, an end elevation of Fig. 1, a part being broken away; Fig. 3, a section of Fig. 4 on the line 3—3; Fig. 4, a side elevation showing the weights at their left limits and at opposite sides of the shaft; Fig. 5, a similar view but with the upper weight positioned as in Fig. 1; Fig. 6, a side elevation showing the weights reversed so that their longer sides lie opposite the shaft; Fig. 7, a view similar to Fig. 6, but with the weights thrown to their right hand limits; and Fig. 8, a similar view, but with one weight arranged at the left as in Fig. 6 and the other at the right as in Fig. 7.

On the drawing, 1 designates a shaft to which is keyed the crank-arm 2 provided with a radial row of holes 3 in any one of which a crank-pin 4 may be placed. The opposite edges of the crank-arm each have a recess 5 running preferably along the whole length thereof, whereby a flange 6 is provided at each edge of the crank-arm.

Weights 7 each having recesses 8 and 9 along two of their adjacent or meeting edges whereby flanges 10 and 11 are provided along the said edges, are pivoted to the flanges 6 by the pivot pins or bolts 12 which lie substantially parallel to the shaft and pass through the flanges 6 and the corner flanges 13 produced by the extensions of the flanges 10 and 11. The weights as shown have their sides between planes cutting the shaft transversely.

The flanges 6 are provided with transverse holes 14. Through these holes and the flanges 10 bolts 15 are placed when the weights are swung on their pivots 12, so as to lie on opposite sides of the crank-pin holes 3, where the weights have their combined mass positioned to produce maximum eccentricity. The weights may both be swung to their opposite limit so that they will have their flanges 11 in that part of the recesses 5 which lie to the left of the pivots 12 or on opposite sides of the shaft 1, as shown in Fig. 4. At these positions the weights will be fastened to the crank-arm 2 by bolts 16 which connect the flanges 6 and 11. With the weights in the latter position the mass of the weights is substantially symmetrically distributed about the shaft.

In Fig. 5, one weight 7 is arranged as in Fig. 1 and the other as in Fig. 4. This arrangement provides a different degree of eccentric disposition of the mass of the weights from that in either Fig. 1 or Fig. 4. This disposition is helped by the fact that the side of weights having the flanges 10 is longer than those having the flanges 11.

In Figs. 6, 7 and 8, the weights are arranged so that the shorter flanges 11 occupy the positions the longer flanges 10 occupy in Figs. 1, 4, and 5; and the longer flanges 10 occupy the positions the shorter flanges 11 occupy in Figs. 1, 4 and 5. Fig. 6 shows the weights on opposite sides of the shaft, while Fig. 7 shows them at opposite sides of the crank-pin holes 3. Fig. 8 shows one weight as in Fig. 6 and the other as in Fig. 7. In order to mount the weights as shown in Figs. 6, 7 and 8, the weights are transferred from the positions shown in Figs. 1, 4 and 5 to the opposite sides of the crank arm and reversed end to end. The distribution of the mass of the weights is obviously different in Figs. 1, 4 and 5 from what it is when connected as in Figs. 6, 7 and 8. It is seen therefore that I am enabled to get a large number of adjustments of the mass of the weights between maximum eccentricity and no eccentricity.

I claim—

1. In a device of the class described, a crank-arm adapted to be connected to a shaft, weights pivoted to opposite edges of the crank-arm for rotation between planes cutting the shaft transversely, and means attaching the weights rigidly to the crank-arm.

2. In a device of the class described, a crank-arm adapted to be connected to a shaft, weights pivoted to opposite edges of the crank-arm for rotation between planes cutting the shaft transversely, and means whereby the weights may be rigidly attached to the crank-arm at either side of the pivots on which the weights rotate.

3. In a device of the class described, a crank-arm adapted to be connected to a shaft and having a flange at each edge, weights having flanges at adjacent edges and at the meeting corners of said edges, pivots extending through the first flanges and the flanges at the said corners of the weights, and means whereby the flanges along the said adjacent edges of the weights may be selectively attached to the first flanges at either side of the pivots.

4. In a device of the class described, a shaft, a crank-arm adapted to be connected to the shaft and having a flange at each edge, weights having flanges at adjacent edges and at the meeting corners of said edges, pivots extending through the first flanges and the flanges at the said corners of the weights and arranged parallel with the shaft, and means whereby the flanges along the said adjacent edges of the weights may be selectively attached to the first flanges at either side of the pivots.

5. In a device of the class described, a shaft, a crank-arm connected thereto, pivots substantially parallel with the shaft and carried by opposite edges of the crank-arm between the shaft and an end of the crank-arm, weights each having a corner and pivoted by the corner to the respective pivots, and means for rigidly holding the weights to the edges of the crank-arm at either side of the pivots.

In testimony whereof, I hereunto affix my signature.

FREDRICK J. SCHWIMMER.